United States Patent [19]

Chandalia et al.

[11] Patent Number: 5,391,722
[45] Date of Patent: Feb. 21, 1995

[54] ACID-CATALYZED FABRICATION OF PRECURSORS FOR USE IN MAKING POLYOLS USING DOUBLE METAL CYANIDE CATALYSTS

[75] Inventors: Kiran B. Chandalia, Cheshire; John W. Reisch; Michael M. Martinez, both of Guilford, all of Conn.

[73] Assignee: Olin Corporation, Cheshire, Conn.

[21] Appl. No.: 530,366

[22] Filed: Mar. 30, 1990

[51] Int. Cl.⁶ .......................... C07H 1/00; C07H 3/00; C07C 43/11; C07C 43/18
[52] U.S. Cl. .................................. 536/18.6; 536/120; 536/124; 568/619; 568/620
[58] Field of Search ............... 536/18.6, 18.5, 120, 536/124; 568/620, 621, 619

[56] References Cited

U.S. PATENT DOCUMENTS

| | | | |
|---|---|---|---|
| 3,829,505 | 8/1974 | Herold | 536/120 |
| 3,941,849 | 3/1976 | Herold | 568/620 |
| 4,284,826 | 8/1981 | Aelony | 568/614 |
| 4,335,188 | 6/1982 | Igi et al. | 428/458 |
| 4,465,828 | 8/1984 | Rau et al. | 536/18.6 |
| 4,472,560 | 9/1984 | Kuyper et al. | 568/620 |
| 4,477,589 | 10/1984 | van der Hulst et al. | 502/169 |
| 4,721,818 | 1/1988 | Harper et al. | 568/621 |
| 4,877,906 | 10/1989 | Harper et al. | 568/621 |

Primary Examiner—John W. Rollins
Assistant Examiner—Everett White
Attorney, Agent, or Firm—Dale Lynn Carlson

[57] ABSTRACT

The present invention relates to a process for making a polyol which comprises the steps of: (a) fabricating a propoxylated polyhydric initiator by reacting propylene oxide with a polyhydric initiator in the presence of an acid catalyst, said reaction being conducted in the absence of a KOH catalyst, to produce a propoxylated polyhydric initiator containing acid catalyst residue(s) and free of KOH catalyst residue, and (b) reacting said propoxylated polyhydric initiator containing acid catalyst residue(s) with an alkylene oxide in the presence of a double metal cyanide complex catalyst to produce a polyol.

6 Claims, No Drawings

5,391,722

ACID-CATALYZED FABRICATION OF PRECURSORS FOR USE IN MAKING POLYOLS USING DOUBLE METAL CYANIDE CATALYSTS

BACKGROUND OF THE INVENTION

The use of double metal cyanide complex catalysts ill the preparation of high molecular weight polyols is well-established in the art. For example, U.S. Pat. No. 3,829,505, assigned to General Tire & Rubber Company, discloses the preparation of high molecular weight diols, triols etc., using these catalysts. The polyols prepared using these catalysts can be fabricated to have a higher molecular weight and a lower amount of end group unsaturation than can be prepared using commonly-used KOH catalysts. The '505 patent discloses that these high molecular weight polyol products are useful in the preparation of nonionic surface active agents, lubricants and coolants, textile sizes, packaging films, as well as in the preparation of solid or flexible polyurethanes by reaction with polyisocyanates.

In order to prepare polyols using double metal cyanide complex catalysts, it is necessary to employ propoxylated initiators as reactants since non-propoxylated initiators such as glycerine fail to react with propylene oxide in the presence of double metal cyanide complex ("DMC") catalysts. This lack of reaction is apparently due to the insolubility of the DMC catalyst in the initiator.

In view of this problem, propoxylated initiator precursors are conventionally prepared by the reaction of propylene oxide with the initiator (such as glycerine) in the presence of a potassium hydroxide ("KOH") catalyst. Unfortunately, the presence of even a small amount of KOH catalyst in the propoxylated precursor kills the catalytic activity of the DMC catalyst utilized in the subsequent polyol-forming reaction. Therefore, removal of the KOH catalyst from the propoxylated precursor must be effected prior to the use of this precursor in the DMC catalyzed production of polyols.

Removal of the KOH catalyst from the propoxylated precursor can be accomplished by any one of several methods described in the patent literature; however, the KOH catalyst removal step is expensive and time-consuming. Accordingly, a new method for providing the desired propoxylated precursors that does not utilize KOH catalyst, and does not require any catalyst separation step prior to the use of these precursors in the DMC catalyzed production of polyols, would be highly desired by the polyol manufacturing community.

SUMMARY OF THE INVENTION

In one aspect, the present invention relates to a process for making a polyol which comprises the steps of:

(a) fabricating a propoxylated polyhydric initiator by reacting propylene oxide with a polyhydric initiator in the presence of an acid catalyst (preferably a Lewis acid or a protic acid), said reaction being conducted in the absence of a KOH catalyst, to produce a propoxylated polyhydric initiator containing acid catalyst residue(s) and free of KOH catalyst residue, and (b) reacting said propoxylated polyhydric initiator containing acid catalyst residue(s) with an alkylene oxide in the presence of a double metal cyanide complex catalyst to produce a polyol.

In another aspect, the present invention relates to the above process, but wherein steps (a) and (b) are carried out simultaneously in a single step.

In yet another aspect, the present invention relates to the polyol product produced by the above processes.

These and other aspects will become apparent from a reading of the following detailed description of the invention.

DETAILED DESCRIPTION OF THE INVENTION

It has now been surprisingly found in accordance with the present invention that the use of acid catalyst(s) in the production of propoxylated precursors for polyols makes it possible to produce polyols directly in a DMC-catalyzed reaction without purification of the propoxylated precursors. Thus, the acid catalysts provide the desired catalysis for producing propoxylated precursors without killing or otherwise adversely affecting the DMC catalyst. This surprising result will be of significant value to DMC-catalyzed polyol producers who heretofore have had to purify the propoxylated precursors prior to contacting the DMC catalyst in order to avoid the killing of the DMC catalyst by KOH catalyst or KOH catalyst residue(s).

The acid catalyst(s) useful in the process of the present invention are preferably Lewis acids, such as $BF_3Et_2O$ (boron trifluoride etherate), $SbF_5$ (antimony pentafluoride), $SbCl_5$ (antimony pentachloride), $F_3CSO_3H$ (trifluorometbane sulfonic acid), as well as protic acids such as $HBF_4$ (tetrafluoroboric acid), $H2SO_4$ (sulfuric acid), and combinations thereof, and the like. The acid catalyst is typically employed in an amount of up to a maximum of about one weight percent based upon the weight of the propoxylated precursor-forming reaction mixture, preferably between about 50 and about 1,500 ppm in the reaction mixture. Exceeding the one percent upper limit of acid catalyst may result in undesirable side reactions.

The polyols made in accordance with the process of the present invention are typically prepared by condensing propylene oxide or a mixture of propylene oxide with other alkylene oxides using random or stepwise addition, with a polyhydric initiator or mixture of initiators, in the presence of a double metal cyanide catalyst. Illustrative other alkylene oxides include ethylene oxide, burylena oxide, amylene oxide, and aralkylene oxides such as styrene oxide, and the like. The most preferred alkylene oxide is propylene oxide or a mixture thereof with ethylene oxide using random or step-wise oxyalkylation.

The polyhydric initiator used in preparing the polyol reactant includes the following and mixtures thereof: the aliphatic triols such as glycerol, propoxylated glycerol adducts, trimethylolpropane, triethylolpropane, trimethylolhexane, and diols such as ethylene glycol, diethylene glycol, triethylene glycol, 1,3-propylene glycol, dipropylene glycol, tripropylene glycol, butylene glycols, butane diols, pentane diols, and the like. In addition, monofunctional and higher functionality initiators are useful in the present invention, including, for example, butanol, sucrose, sorbitol, pentaerythritol, and the like. In addition to the above, other suitable polyhydric initiators are disclosed in U.S. Pat. Nos. 4,472,560 and 4,477,589 to Shell Chemical Company and U.S. Pat. Nos. 3,941,849 and 4,335,188 to General Tire & Rubber Company, the disclosures of which are incorporated herein by reference in their entirety. Particularly preferred polyhydric initiators include glycerol, trimethylol propane, diethylene glycol, dipropylene glycol, and tripropylene glycol.

The alkylene oxide-polyhydric initiator condensation reaction is carried out in the presence of a double metal cyanide catalyst. Without wishing to be bound by any particular theory, it is speculated by the present inventors that unsaturated end groups result in monofunctional species that act as chain stoppers in elastomer formation. In polyol synthesis with KOH catalysis the unsaturation formed increases as a direct function of equivalent weight. Eventually conditions are established wherein further propylene oxide addition fails to increase the molecular weight. In other words the use of alkali catalysts to produce high molecular weight, hydroxy terminated polyoxypropylene ethers results in a substantial loss in hydroxy functionality. With double metal cyanide catalysis much less unsaturation is formed allowing higher equivalent weight polyols to be prepared. Typically, the polyol will have an equivalent in the range of between about 1,000 and 20,000, preferably between about 1,500 and about 5,000, although lower or higher equivalent weights may be produced as desired.

The double metal cyanide complex class catalysts suitable for use and their preparation are described in U.S. Pat. Nos. 4,472,560 and 4,477,589 to Shell Chemical Company and U.S. Pat. Nos. 3,941,849 and 4,335,188 to General Tire & Rubber Company. The teachings of the foregoing patents are incorporated herein by reference.

One double metal cyanide complex catalyst found particularly suitable for use is a zinc hexacyanometallate of formula:

$$Zn_3[M(CN)_6]_2 \cdot xZnCl_2 \cdot yGLYME \cdot zH_2O$$

wherein M may be Co(III), or Cr(III) or Fe(II) or Fe(III); x, y, and z may be fractional numbers, integers, or zero and vary depending on the exact method of preparation of the complex, preferably independently being between 0 and 15.

As used herein, the term "molecular weight" is intended to designate number average molecular weight, and "equivalent weight" designates the molecular weight of the polyol divided by the functionality thereof.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited are incorporated herein by reference in their entirety.

The following examples are intended to illustrate, but in no way limit the scope of, the present invention.

EXAMPLE 1

Step (A) -Preparation of a Propoxylated Glycerine Precursor using an $SbF_5$ Catalyst Glycerine (100 g, 1.09 mol., 3.26 eq.) was added to a flask equipped with a reflux condenser and blanketed with nitrogen. Antimony pentafluoride (0.10 g, 0.00046 mol.) was added and the mixture was stirred and propylene oxide (400 g, 6.8eq.) was added through a dropping funnel over a period of one hour. The flask was cooled in an ice bath to maintain the temperature below 34° C. After the addition was complete the mixture was stirred for 0.5 hour and then an attempt was made to distill off unreacted propylene oxide. No propylene oxide distilled off indicating that it had all reacted. The theoretical molecular weight of the product was 460. A gel permation chromatograph was run of the sample and it showed a molecular weight of 439.

A number of propoxylated precursors were prepared with glycerine and dipropylene glycol using a similar procedure and a variety of acid catalysts and the data are presented in Tables 1 and 2.

TABLE 1

| | | Precursors Prepared From Glycerine | | | | |
|---|---|---|---|---|---|---|
| CATALYST | GMS OF CATALYST | GMS OF GLYCERINE | GMS PO REACTED | EST. HYDROXYL # | EST. EQ. WT. | MW (BY GPC) |
| $SbF_5$ | 0.3 | 100 | 400 | 365 | 153.6 | — |
| $SbF_5$ | 0.1 | 100 | 400 | 365 | 153.6 | 439 |
| $BF_3$ | 0.1 | 100 | 400 | 365 | 153.6 | — |
| $HBF_4$ | 0.3 | 100 | 400 | 365 | 153.6 | 483 |
| $HBF_4$ | 0.1 | 100 | 264 | 502 | 111.7 | — |
| $CF_3SO_3H$ | 0.3 | 100 | 400 | 365 | 153.6 | 483 |
| $CF_3SO_3H$ | 0.1 | 100 | 316 | 439 | 127.7 | — |
| $BF_3$ | 1.15 | 100 | 400 | 365 | 153.6 | 481 |
| $BF_3$ | 0.20 | 100 | 400 | 365 | 153.6 | 496 |
| $BF_3$ | 0.13 | 100 | 400 | 365 | 153.6 | 391 |
| $SbCl_5$ | 0.33 | 50 | 150 | 457 | 122.8 | — |

TABLE 2

| | | Precursors From Dipropylene Glycol | | | | |
|---|---|---|---|---|---|---|
| CATALYST | GMS OF CATALYST | GMS OF GLYCERINE | GMS PO REACTED | EST. HYDROXYL # | EST. EQ. WT. | MW (BY GPC) |
| $SbF_5$ | 0.05 | 50 | 200 | 167.4 | 335 | 761 |
| $SbF_5$ | 0.1 | 50 | 200 | 167.4 | 335 | 779 |
| $HBF_4$ | 0.2 | 50 | 143 | 216.6 | 259 | — |
| $BF_3$ | 0.5 | 50 | 200 | 167.4 | 335 | 583 |
| $SbCl_5$ | 0.08 | 50 | 70 | 348.4 | 161 | — |
| $SbCl_5$ | 0.25 | 50 | 87.5 | 304.0 | 184.5 | 383 |

Step (B) - Use of a Precursor Using SbF5 to Prepare a Polyol Using DMC Catalysis A propoxylated glycerine precursor (100 g 0.748 eq.) that was prepared with SbF$_5$ catalyst was added to a 1 liter autoclave. Zinc hexacyanocobaltate catalyst Zn$_3$(Co(CN)$_6$)$_2$ (0.64 g) was added and the autoclave was flushed with nitrogen three times. The mixture was heated to 100° C. Propylene oxide (30 g) was added and it reacted as evidenced by a drop in the pressure. Propylene oxide was fed into the reactor at a rate to maintain the pressure below 20 psi and 609 g of PO was added within two hours. At this point 548 g of the mixture was removed to allow space for more epoxide leaving 162.1 g in the reactor. An additional 340 g of propylene oxide was fed into the reactor over a period of 1.5 hours to produce a polyol with a molecular weight of 10,000, OH number 16.75.

In a similar manner precursors that were prepared with BF$_3$/glycerine/PO and HBF$_4$/glycerine/PO and SbF$_5$/glycerine/DPG were used to make 10,000 molecular weight polyols with zinc hexacyanocobaltate. In all cases the reactivity of the DMC catalyst was not diminished by the presence of the acid in the precursor.

EXAMFLE 2

Direct Preparation of a Polyol with Glycerine/SbF5/DMC Catalyst/Propylene Oxide

Glycerine (33 g, 0.358 mol., 1.07 eq.) was added to a reactor. Zinc hexacyanocobaltate (0.64 g) and antimony pentafluoride 0.10 g were added and the mixture was flushed with nitrogen. The mixture was maintained at 30° C. and propylene oxide (133 g, 2.29 eq.) was added slowly over a 1.5 hour period. The mixture was then heated to 100° C. and no pressure formed indicating that all the propylene oxide had reacted. An additional 615 g (10.6 eq.) of propylene oxide was fed into the reactor at a rate to maintain the pressure at 20 psi, which required approximately 2 hours. A portion of this mixture (625 g) was removed from the reactor to allow room for additional epoxide leaving 148.6 g in the reactor. An additional 516 g of propylene oxide was fed into the reactor at a rate to maintain the propylene oxide pressure at 20 psi (approximately 2 hours) to produce a 10,000 molecular weight polyol, OH number 17.

What is claimed is:

1. A process for making a polyol which comprises the steps of:
   (a) fabricating a propoxylated polyhydric initiator by reacting propylene oxide with a polyhydric initiator in the presence of a Lewis acid acid catalyst, said reaction being conducted in the absence of a KOH catalyst, to produce a propoxylated polyhydric initiator containing acid catalyst residue(s) and free of KOH catalyst residue, and
   (b) reacting said propoxylated polyhydric initiator containing acid catalyst residue(s) with an alkylene oxide in the presence of a double metal cyanide complex catalyst to produce a polyol.

2. The process of claim 1 wherein the acid catalyst is selected from the group consisting of: boron trifluoride etherate, antimony pentafluoride, antimony pentachloride, trifluoromethane sulfonic acid, and combinations thereof.

3. The process of claim 1 wherein the acid catalyst is employed in a catalytically effective amount of up to about one weight percent based upon the weight of the propoxylated precursor-forming reaction mixture.

4. The process of claim 1 wherein the acid catalyst is employed in an amount of between about 50 and about 1,500 ppm in the reaction mixture.

5. The process of claim 1 wherein the polyhydric initiator is selected from the group consisting of glycerol, trimethylolpropane, triethylolpropane, trimethylolhexane, ethylene glycol, diethylene glycol, triethylene glycol, 1,3-propylene glycol, dipropylene glycol, tripropylene glycol, butylene glycols, butane diols, penfane diols, sucrose, sorbitol, pentaerythritol, and combinations thereof.

6. The process of claim 1, but wherein steps (a) and (b) are carried out simultaneously in a single step.

* * * * *